(12) United States Patent
Dai et al.

(10) Patent No.: US 11,258,265 B2
(45) Date of Patent: Feb. 22, 2022

(54) METHOD AND APPARATUS FOR CONTROLLING SOLAR POWER SYSTEMS

(71) Applicant: Futurewei Technologies, Inc., Plano, TX (US)

(72) Inventors: Heping Dai, Plano, TX (US); Xiaolin Mao, Plano, TX (US); Dianbo Fu, Frisco, TX (US); Huibin Zhu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/780,293

(22) Filed: Feb. 3, 2020

(65) Prior Publication Data
US 2020/0176991 A1  Jun. 4, 2020

Related U.S. Application Data

(62) Division of application No. 15/493,796, filed on Apr. 21, 2017, now Pat. No. 10,554,050.

(51) Int. Cl.
*H02J 3/38* (2006.01)
*H02S 50/10* (2014.01)
*H02S 50/00* (2014.01)

(52) U.S. Cl.
CPC ............... *H02J 3/385* (2013.01); *H02J 3/38* (2013.01); *H02J 3/381* (2013.01); *H02S 50/00* (2013.01); *H02S 50/10* (2014.12)

(58) Field of Classification Search
CPC ...................................................... H02J 3/385
See application file for complete search history.

(56) References Cited

U.S. PATENT DOCUMENTS

| | | | |
|---|---|---|---|
| 7,570,033 B1 | 8/2009 | Ju | |
| 8,319,483 B2 | 11/2012 | Fishelov et al. | |
| 11,012,002 B1* | 5/2021 | Xu | H02M 1/14 |
| 2009/0039852 A1* | 2/2009 | Fishelov | H02M 3/157 |
| | | | 323/283 |
| 2009/0284998 A1 | 11/2009 | Zhang et al. | |
| 2010/0207455 A1 | 8/2010 | Erickson, Jr. et al. | |
| 2011/0037446 A1* | 2/2011 | Engelhardt | H02M 3/1582 |
| | | | 323/282 |
| 2011/0241431 A1 | 10/2011 | Chen et al. | |
| 2012/0025752 A1 | 2/2012 | Teggatz et al. | |
| 2012/0043818 A1 | 2/2012 | Stratakos et al. | |
| 2012/0049819 A1 | 3/2012 | Mao et al. | |
| 2012/0126624 A1 | 5/2012 | Hester et al. | |
| 2012/0175963 A1 | 7/2012 | Adest et al. | |
| 2013/0114321 A1 | 5/2013 | Zhang | |

(Continued)

FOREIGN PATENT DOCUMENTS

| | | |
|---|---|---|
| CN | 101800498 A | 8/2010 |
| CN | 102437765 A | 5/2012 |

(Continued)

*Primary Examiner* — Adi Amrany
(74) *Attorney, Agent, or Firm* — Slater Matsil, LLP

(57) ABSTRACT

An apparatus includes a four-switch power converter having input terminals coupled to a power source and output terminals coupled to a capacitor, wherein the capacitor is connected in series with the power source, and a common node of the capacitor and the power source is connected to one input terminal of the four-switch power converter.

20 Claims, 8 Drawing Sheets

(56) References Cited

U.S. PATENT DOCUMENTS

| | | | |
|---|---|---|---|
| 2014/0225577 A1* | 8/2014 | Ivanov | H02M 3/1582 |
| | | | 323/225 |
| 2015/0162835 A1* | 6/2015 | Hang | H02M 3/1582 |
| | | | 323/271 |
| 2015/0214887 A1* | 7/2015 | Ben-Yaakov | H02M 1/083 |
| | | | 307/52 |
| 2016/0087579 A1 | 3/2016 | Moslehi | |
| 2016/0094135 A1* | 3/2016 | Dai | H02M 3/33576 |
| | | | 363/21.02 |
| 2016/0141958 A1* | 5/2016 | Deng | H02M 3/1582 |
| | | | 323/271 |
| 2016/0172861 A1 | 6/2016 | Baba | |
| 2016/0181920 A1* | 6/2016 | Dai | H02M 1/14 |
| | | | 323/271 |
| 2016/0294285 A1* | 10/2016 | Le Men | H02M 3/1582 |
| 2017/0085088 A1 | 3/2017 | Urabe et al. | |
| 2017/0237271 A1* | 8/2017 | Kelly-Morgan | H02J 7/007 |
| | | | 320/166 |
| 2018/0159426 A1* | 6/2018 | Vinciarelli | H02M 3/04 |
| 2018/0226890 A1 | 8/2018 | Dai | |
| 2018/0233614 A1 | 8/2018 | Dai et al. | |

FOREIGN PATENT DOCUMENTS

| | | | | |
|---|---|---|---|---|
| CN | 204696998 U | 10/2015 | | |
| CN | 105098832 A | 11/2015 | | |
| CN | 105378577 A | 3/2016 | | |
| CN | 105978386 A | 9/2016 | | |
| CN | 110301081 A | 10/2019 | | |
| WO | WO-2017096355 A1 * | 6/2017 | | H02M 3/1582 |

* cited by examiner

METHOD AND APPARATUS FOR CONTROLLING SOLAR POWER SYSTEMS

PRIORITY CLAIM AND CROSS-REFERENCE

This application is a divisional of U.S. application Ser. No. 15/493,796, filed on Apr. 21, 2017, which application is hereby incorporated herein by reference.

TECHNICAL FIELD

The present disclosure relates to an apparatus and method for achieving maximum power at each solar panel of a solar power system, and, in particular embodiments, to an apparatus and method for achieving maximum power in a solar power system having a plurality of power optimizers.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. Since the majority of applications are designed to run on 120 volts ac power, solar inverter systems are employed to convert the variable dc voltage of the solar panels to a 120 volts ac power source.

In accordance with the topology difference, solar inverter systems may be divided into four categories, namely micro solar inverter systems, string solar inverter systems, central solar inverter systems and solar inverter systems having power optimizers. A micro solar inverter is an inverter designed to operate with a single solar panel. The micro solar inverter converts the direct current output from the single solar panel into alternating current. A string solar inverter is an inverter designed to operate with a plurality of solar panels connected in series. The string solar inverter converts the direct current output from the plurality of solar panels into alternating current.

In a central solar inverter system, a combiner box is employed to bring the outputs of a plurality of solar panels/strings together and consolidate the incoming power into one main power source. The center solar inverter converts the direct current from the main power source into alternating current. In a solar inverter system having power optimizers, each solar panel is connected to the inverter through a power optimizer. The power optimizer may be implemented as a four-switch buck-boost converter. The four-switch buck-boost converter is used to increase the energy output from the solar panel by tracking the maximum power point of the solar panel.

SUMMARY

These and other problems are generally solved or circumvented, and technical advantages are generally achieved, by preferred embodiments of the present disclosure which provide a control method for achieving a high efficiency operation of a solar system having a plurality of power optimizers.

In accordance with an embodiment, an apparatus comprises a four-switch power converter having input terminals coupled to a power source and output terminals coupled to a capacitor, wherein the capacitor is connected in series with the power source, and a common node of the capacitor and the power source is connected to one input terminal of the four-switch power converter.

In accordance with another embodiment, an apparatus comprises a solar panel and a capacitor connected in series and a buck-boost converter having a first input/output terminal connected to the capacitor, a second input/output terminal connected to a common node of the solar panel and the capacitor, and a third input/output terminal connected to the solar panel.

In accordance with yet another embodiment, a system comprises a plurality of power modules connected in series between two input terminals of an inverter, a plurality of local controllers coupled to their respective power modules, wherein a first local controller of the plurality of local controllers is coupled to a first power module comprising a first solar panel, a first capacitor and a first power optimizer, and wherein the first local controller is configured to enable the first power optimizer to switch among a buck mode, a boost mode and a pass-through mode based upon a maximum power point tracking (MPPT) current of the first solar panel and a central controller coupled to the inverter, wherein the central controller is configured to regulate an input voltage of the inverter.

An advantage of an embodiment of the present disclosure is a solar power system providing higher efficiency power conversion.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a control method for improving the performance of a solar power system having a plurality of power optimizers. The disclosure may also be applied, however, to a variety of power systems. Hereinafter, various embodiments will be explained in detail with reference to the accompanying drawings.

Figure 1:
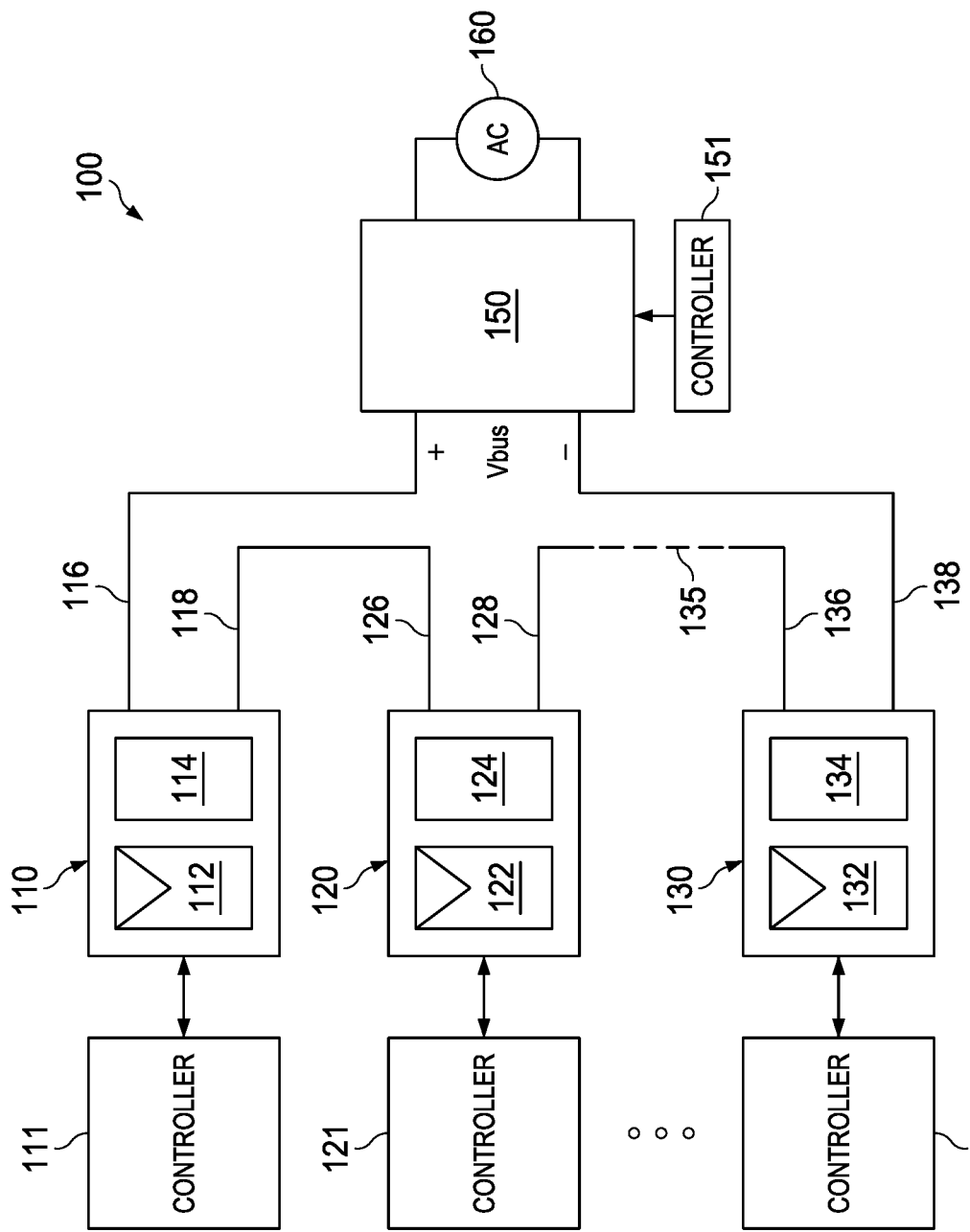
FIG. 1 illustrates a block diagram of a solar power system in accordance with various embodiments of the present disclosure.

FIG. 1 illustrates a block diagram of a solar power system in accordance with various embodiments of the present disclosure. The solar power system 100 comprises a plurality of power modules 110, 120 and 130, an inverter 150, a plurality of local controllers 111, 121 and 131, and a central controller 151. In some embodiments, the power modules 110, 120 and 130 are connected in series to build a higher voltage fed into the inverter 150 as shown in FIG. 1. The inverter 150 converts the direct current from the plurality of power modules into alternating current fed into a load and/or a power grid 160.

In some embodiments, each power module (e.g., power module 110) comprises a solar panel and a power optimizer. A local controller (e.g., local controller 111) is electrically coupled to a corresponding power module (e.g., power module 110). The local controller is employed to control the operation of the power module. The detailed operation principles of the local controllers will be described below with respect to FIGS. 7-9.

As shown in FIG. 1, a first power module 110 comprises a first solar panel 112 and a first power optimizer 114. Likewise, a second power module 120 comprises a second solar panel 122 and a second power optimizer 124. A third power module 130 comprises a third solar panel 132 and a third power optimizer 134.

The power modules 110, 120 and 130 of the solar power system 100 are connected in series. As shown in FIG. 1, a first terminal 116 of the first power module 110 is connected to a positive input terminal of the inverter 150. A second terminal 118 of the first power module 110 is connected to a first terminal 126 of the second power module 120. As shown in FIG. 1, there may be a plurality of power modules connected in series and between the second power module 120 and the third power module 130 as indicated by the dashed line 135. As such, the second terminal 128 of the second power module 120 is connected to the first terminal 136 of the third power module 130 through the plurality of power modules (not shown) as indicated by the dashed line 135. A second terminal of the third power module 130 is connected to the negative input terminal of the inverter 150.

The outputs of the power modules 110, 120, 130 and the plurality of power modules between 120 and 130 are connected in series to build a higher voltage fed into the inverter 150. As shown in FIG. 1, the series connected power modules function as a direct current power source and the inverter 150 converts the energy from the direct current power source into alternating current. The structure of the power modules (e.g., power module 110) will be described below with respect to FIGS. 2-5.

The inverter 150 is employed to invert a dc waveform received from the output of the plurality of power modules 110, 120 and 130 to an ac waveform. In some embodiments, the inverter 150 may comprise a plurality of switching elements such as insulated gate bipolar transistor (IGBT) devices. Alternatively, each inverter unit may include other types of controllable devices such as metal oxide semiconductor field effect transistor (MOSFET) devices, bipolar junction transistor (BJT) devices, super junction transistor (SJT) devices, bipolar transistors and/or the like.

The central controller 151 is employed to control the operation of the inverter 150. More particularly, the central controller 151 receives various operation parameters from the power modules as well as the inverter 150. Based upon the various operation parameters, the central controller 151 generates a variety of control signals to control the operation parameters of the inverter 150 such as the input voltage Vbus of the inverter 150, the output current of the inverter 150 and/or the like.

It should be noted that FIG. 1 illustrates a central controller and a plurality of local controllers. This diagram is merely an example, which should not unduly limit the scope of the claims. One of ordinary skill in the art would recognize many variations, alternatives, and modifications. For example, the central controller 151 and the plurality of local controllers 111, 121 and 131 in FIG. 1 may be replaced by a single controller. Furthermore, a person skilled in the art would understand there may be various communication channels between the central controller 151 and the plurality of local controllers 111, 121 and 131.

It should further be noted the system configuration shown in FIG. 1 is merely an exemplary system and is not meant to limit the current embodiments. A person skilled in the art would understand that other necessary elements/components, such as input filters, output filters and/or the like, may alternatively be added into the solar power system 100 depending on different applications and design needs.

Figure 2:
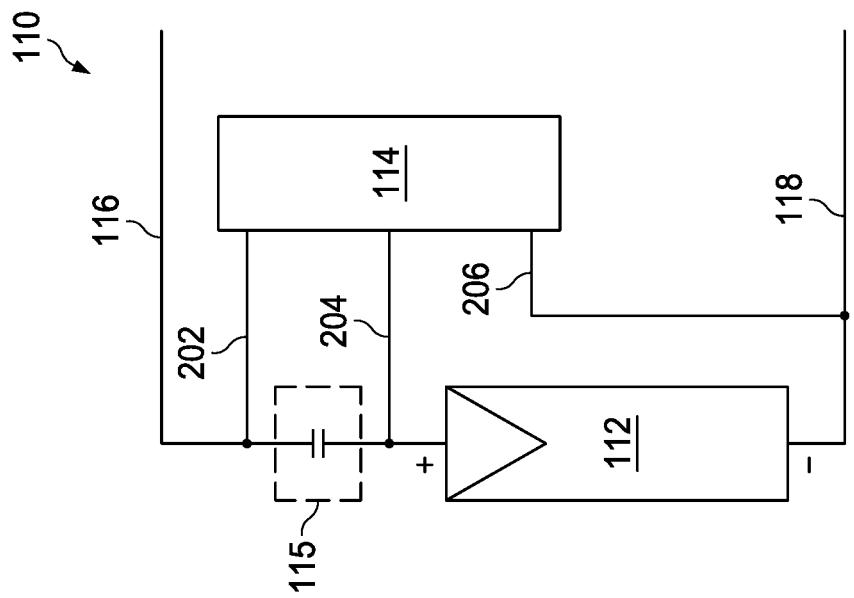
FIG. 2 illustrates a block diagram of a first implementation of the power modules shown in FIG. 1 in accordance with various embodiments of the present disclosure.

FIG. 2 illustrates a block diagram of a first implementation of the power modules shown in FIG. 1 in accordance with various embodiments of the present disclosure. In some embodiments, the power modules 110, 120 and 130 shown in FIG. 1 may be of a similar structure. For simplicity, only the block diagram of the first power module 110 is illustrated in detail in FIG. 2.

The first power module 110 includes the first solar panel 112, the first power optimizer 114 and a first capacitor 115. The first power module 110 further comprises a first input/output terminal 116 and a second input/output terminal 118. As shown in FIG. 2, the first capacitor 115 and the first solar panel 112 are connected in series and between the first input/output terminal 116 and the second input/output terminal 118. More particularly, the capacitor 115 is connected to a positive terminal of the first solar panel 112.

The first power optimizer 114 has three input/output terminals. As shown in FIG. 2, a first input/output terminal 202 is connected to the first input/output terminal 116 of the first power module 110. A second input/output terminal 204 is connected to a common node of the first capacitor 115 and the first solar panel 112. A third input/output terminal 206 is connected to the second input/output terminal 118 of the first power module 110. The detailed schematic diagram of the first power optimizer 114 will be described below with respect to FIG. 4.

One advantageous feature of having the first capacitor 115 and the first solar panel 112 connected in series is the voltage stresses across the output capacitor (e.g., the first capacitor 115) of the first power optimizer 114 have been reduced, thereby improving the reliability of the solar power system.

Figure 3:
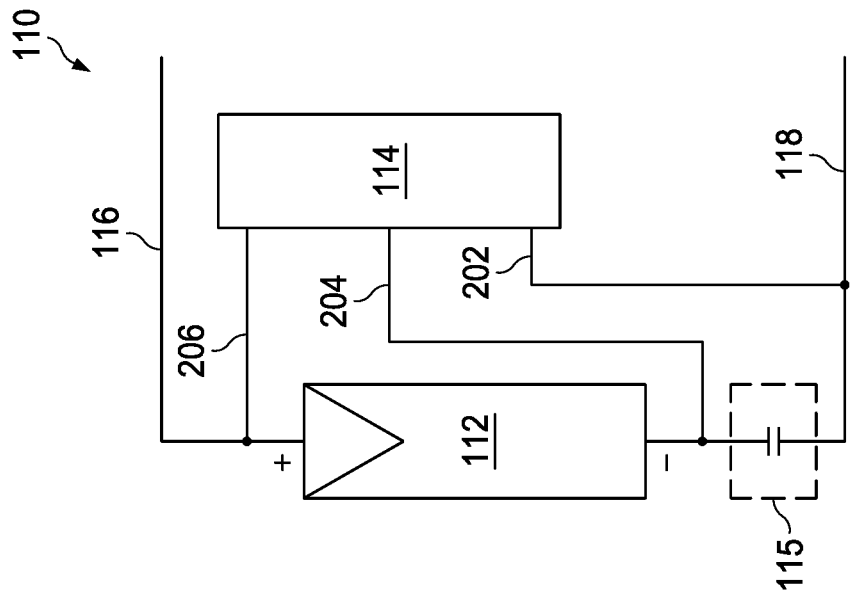
FIG. 3 illustrates a block diagram of a second implementation of the power modules shown in FIG. 1 in accordance with various embodiments of the present disclosure.

FIG. 3 illustrates a block diagram of a second implementation of the power modules shown in FIG. 1 in accordance with various embodiments of the present disclosure. The first power module 110 includes the first solar panel 112, the first power optimizer 114 and the first capacitor 115.

As shown in FIG. 3, the first solar panel 112 and the first capacitor 115 are connected in series and between the first input/output terminal 116 and the second input/output terminal 118. More particularly, the capacitor 115 is connected to a negative terminal of the first solar panel 112. The first power optimizer 114 has three input/output terminals. As shown in FIG. 3, the first input/output terminal 202 is connected to the first input/output terminal 116 of the first power module 110. A second input/output terminal 204 is connected to a common node of the first capacitor 115 and the first solar panel 112. A third input/output terminal 206 is connected to the second input/output terminal 118 of the first power module 110. The detailed schematic diagram of the first power optimizer 114 will be described below with respect to FIG. 5.

Figure 4:
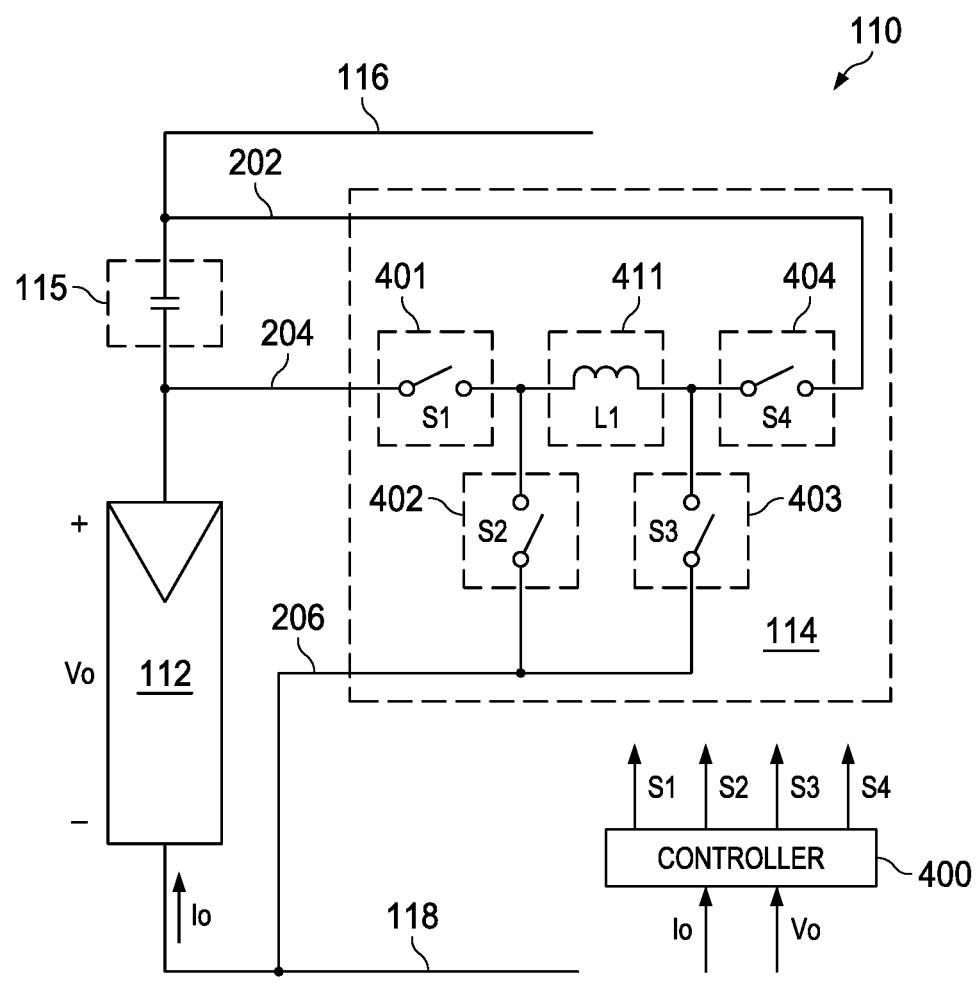
FIG. 4 illustrates a schematic diagram of the first power optimizer shown in FIG. 2 in accordance with various embodiments of the present disclosure.

FIG. 4 illustrates a schematic diagram of the first power optimizer shown in FIG. 2 in accordance with various embodiments of the present disclosure. In some embodiments, the first power optimizer 114 is implemented as a four-switch buck-boost converter. Throughout the description, the first power optimizer 114 is alternatively referred to as the buck-boost converter 114.

The buck-boost converter 114 comprises a first high-side switch 401, a first low-side switch 402, a second high-side switch 404, a second low-side switch 403 and an inductor 411. Throughout the description, the first high-side switch 401 is alternatively referred to as the first high-side switch S1. The first low-side switch 402 is alternatively referred to as the first low-side switch S2. The second high-side switch 404 is alternatively referred to as the second high-side switch S4. The second low-side switch 403 is alternatively referred to as the second low-side switch S3. The inductor 411 is alternatively referred to as the inductor L1.

The first high-side switch S1 and the first low-side switch S2 are connected in series between the second input/output terminal 204 and the third input/output terminal 206 of the buck-boost converter 114. The second high-side switch S4 and the second low-side switch S3 are connected in series between the first input/output terminal 116 and the second input/output terminal 118. The inductor L1 is coupled between the common node of the first high-side switch S1 and the first low-side switch S2, and the common node of the second high-side switch S4 and the second low-side switch S3.

The buck-boost converter 114 may further comprise a controller 400. As shown in FIG. 1, the controller 400 may detect the output voltage Vo of the first solar panel 112 and the current flowing through the solar panel 112, and generate a plurality of gate drive signals for driving switches S1, S2, S3 and S4 accordingly. The controller 400 may be a PWM controller. Alternatively, the controller 400 may be implemented as a digital controller such as a micro-controller, a digital signal processor and/or the like.

It should be noted that while the example throughout the description is based upon a buck-boost converter and a controller configured to generate gate drive signal for the buck-boost converter (e.g., buck-boost converter shown in FIG. 4), the buck-boost converter 114 as well as the controller 400 shown in FIG. 4 may have many variations, alternatives, and modifications. For example, the controller 400 may detect other necessary signals such as the operation temperature and the solar radiation of the first solar panel 112.

Furthermore, there may be one dedicated driver or multiple dedicated drivers coupled between the controller 400 and the switches S1, S2, S3 and S4. In sum, the buck-boost converter 114 and the controller 400 illustrated herein is limited solely for the purpose of clearly illustrating the inventive aspects of the various embodiments. The present disclosure is not limited to any particular power topology.

The buck-boost converter 114 may be divided into two portions, namely a buck converter portion and a boost converter portion. The buck converter portion may comprise the first high-side switch S1 and the first low-side switch S2. The buck converter portion and the inductor L1 may function as a step-down converter when the second high-side switch S4 is always on and the second low-side switch S3 is always off. Under such a configuration, the buck-boost converter 114 operates in a buck mode.

The boost converter portion of the buck-boost converter 114 may comprise the second high-side switch S4 and second low-side switch S3. The boost converter portion and the inductor L1 may function as a step-up converter when the first high-side switch S1 is always on and the first low-side switch S2 is always off. Under such a configuration, the buck-boost converter 114 operates in a boost mode. Furthermore, the buck-boost converter 114 operates in a pass-through mode when the high-side switches S1 and S4 are always on, and the low-side switches S2 and S3 are always off.

The switches (e.g., the first high-side switch S1) shown in FIG. 4 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 4 illustrates four switches S1, S2, S3, and S4, various embodiments of the present disclosure may include other variations, modifications and alternatives. For example, the first low-side switch S2 may be replaced by a freewheeling diode and/or the like. The second high-side switch S4 may be replaced by a rectifier diode and/or the like.

Based upon different application needs, the buck-boost converter 114 may be configured to operate in three different operating modes, namely the buck mode, the boost mode and the pass-through mode. The detailed operating principles of these three modes will be described below with respect to FIGS. 7-9.

Figure 5:
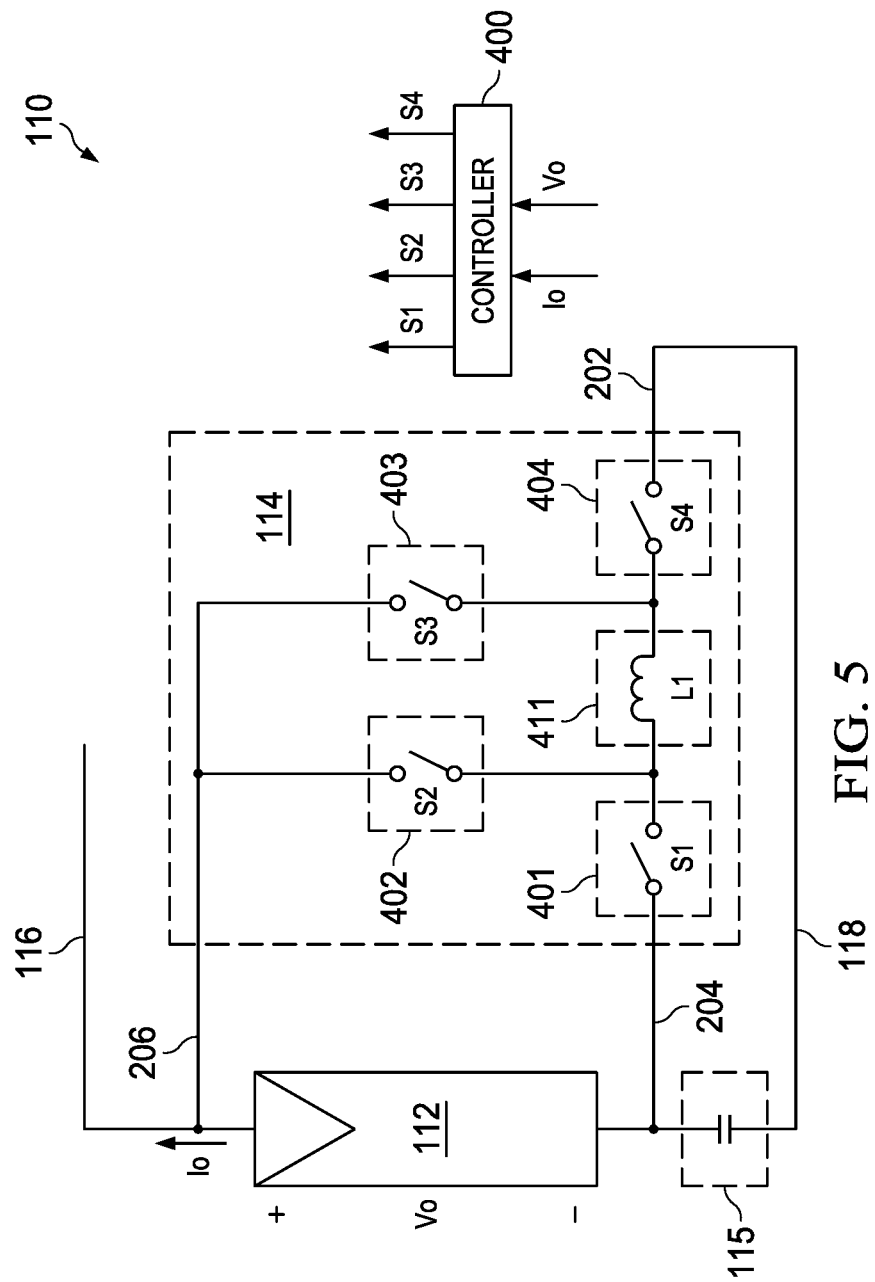
FIG. 5 illustrates a schematic diagram of the first power optimizer shown in FIG. 3 in accordance with various embodiments of the present disclosure.

FIG. 5 illustrates a schematic diagram of the first power optimizer shown in FIG. 3 in accordance with various embodiments of the present disclosure. The structure and the operating principles of the first power optimizer 114 shown in FIG. 5 are similar to the structure and the operating principles of the first power optimizer 114 shown in FIG. 4, and hence are not discussed herein again to avoid repetition.

Figure 6:
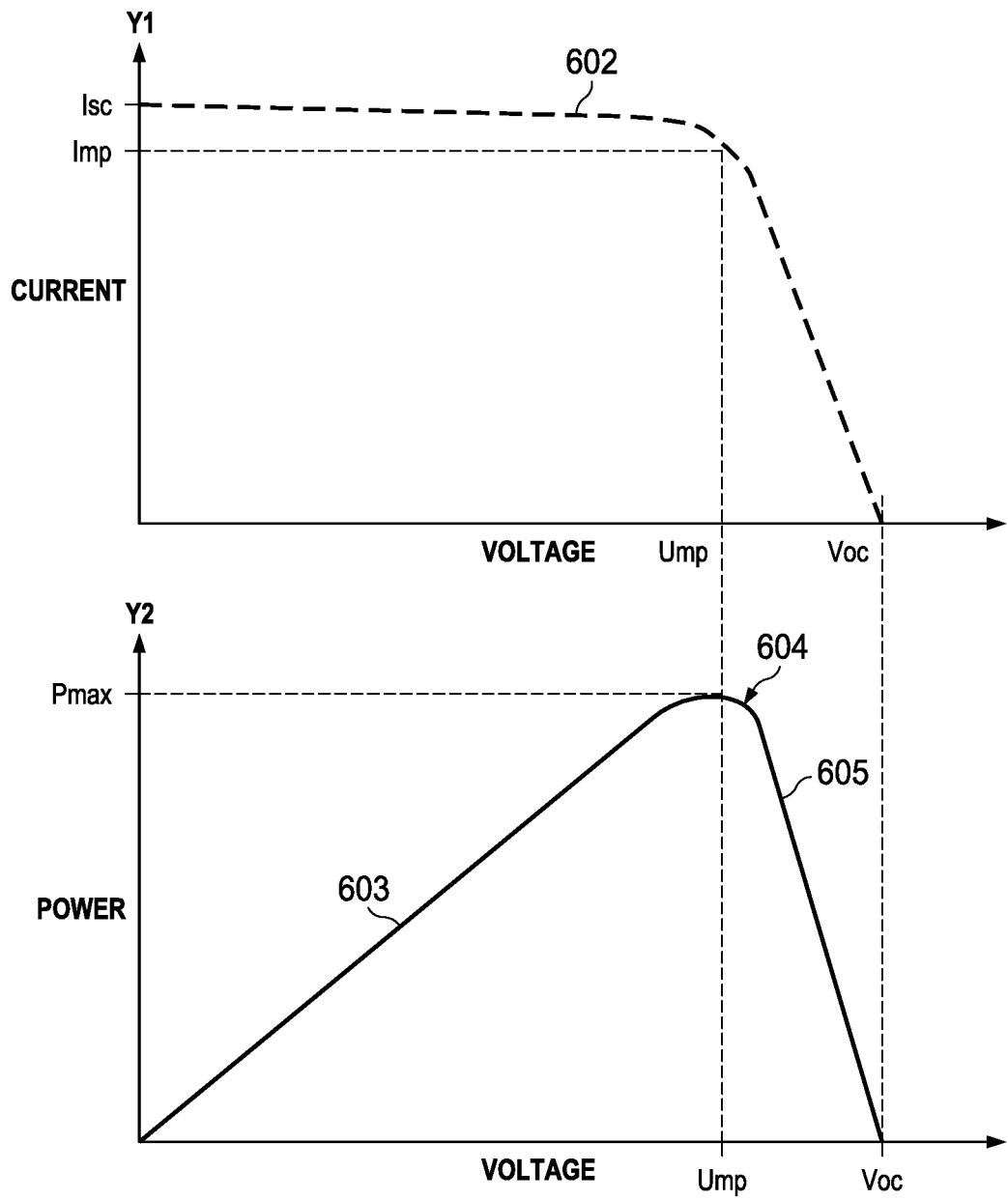
FIG. 6 illustrates a power-voltage characteristic curve and a current-voltage curve of a solar panel in accordance with various embodiments of the present application.

FIG. 6 illustrates a power-voltage characteristic curve and a current-voltage curve of a solar panel in accordance with various embodiments of the present application. The horizontal axis of FIG. 6 represents the output voltage of a solar panel. There may be two vertical axes. The first vertical axis Y1 represents the current flowing through the solar panel. The second vertical axis Y2 represents the power generated from the solar panel.

A first curve 602 shows the current flowing through the solar panel versus the output voltage of the solar panel. The current of the solar panel is in a range from about zero to a short circuit current Isc. The voltage of the solar panel is in a range from about zero to an open circuit voltage Voc.

The solar panel may produce its maximum current Isc when there is a short circuit in the solar panel. As shown in FIG. 6, when the solar panel is shorted, the output voltage of the solar panel is approximately equal to zero. Conversely, the maximum voltage Voc of the solar panel occurs when there is an open circuit occurred (e.g., the solar panel is disconnected from any circuit). Under the open circuit condition, the current flowing through the solar panel is approximately equal to zero.

A second curve 604 shows the power generated by the solar panel versus the output voltage of the solar panel. The power available from the solar panel is the product of the current flowing though the solar panel and the output voltage of the solar panel. As shown in FIG. 6, at the short circuit and the open circuit conditions, the power of the solar panel is about zero. The maximum available power Pmax of the solar panel is at a point on the knee of the curve 602 as shown in FIG. 6. The voltage and current at this maximum power point are designated as Vmp and Imp, respectively as shown in FIG. 6.

The second curve 604 may be divided into two portions, namely a first portion 603 and a second portion 605. As shown in FIG. 6, the first portion 603 is a line sloping upward from about zero to the maximum power Pmax. The second portion 605 is a line sloping downward from the maximum power Pmax to about zero.

The maximum power Pmax of the solar panel can be obtained through a trial and error process. For example, the output voltage and the current flowing through the solar panel are measured during a plurality of predetermined testing intervals. In each testing interval, the power of the solar panel is calculated based upon the measured voltage and current values. If the power in a new testing interval is approximately equal to the power in a previous testing interval, the voltage of the solar panel is maintained unchanged. Otherwise, depending on the operating point of the solar panel, the output voltage of the solar panel may be adjusted accordingly. For example, when the solar panel operates at the first portion 603 of the curve 604, both the power and the voltage are increased or decreased at the same time. The output voltage of the solar panel is increased by a predetermined value. As a result, the power of the solar panel approaches close to the maximum available power under a particular amount of solar radiation.

On the other hand, when the solar panel operates at the second portion 605 of the curve 604, the power and the voltage go to opposite directions. For example, the power is increased, but the voltage is decreased. Alternatively, the power is decreased, but the voltage is increased. In order to approach close to the maximum available power, the voltage of the solar panel is decreased by a predetermined value. Through the trial and error process, under a particular amount of solar radiation, the maximum power point or Pmax of the solar panel can be tracked.

Figure 7:
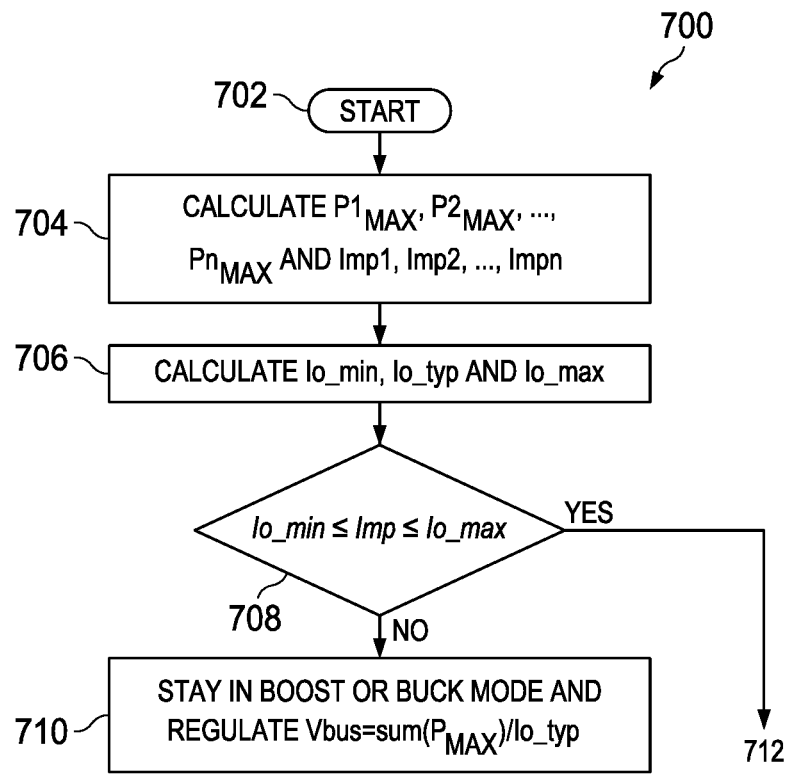
FIGS. 7-8 illustrate a flow chart of a method for controlling the solar power system shown in FIG. 1 in accordance with various embodiments of the present application.
Figure 8:
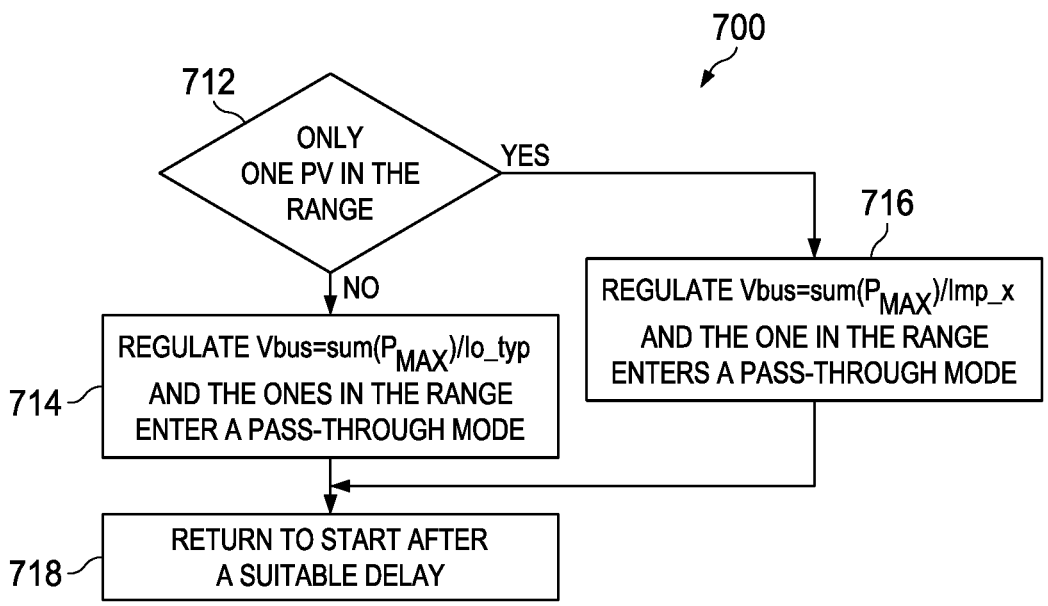

FIGS. 7-8 illustrate a flow chart of a method 700 for controlling the solar power system 100 shown in FIG. 1 in accordance with various embodiments of the present application. This flow chart shown in FIGS. 7-8 is merely an example, which should not unduly limit the scope of the claims. One of ordinary skill in the art would recognize many variations, alternatives, and modifications. For example, various steps as illustrated in FIGS. 7-8 may be added, removed, replaced, rearranged and repeated.

FIG. 7 illustrates a first portion of the method 700 in accordance with various embodiments of the present application. FIG. 8 illustrates a second portion of the method 700 in accordance with various embodiments of the present application.

Referring back to FIG. 1, the solar power system 100 may include n power modules connected in series between two input terminals of the inverter 150. Each power module comprises a solar panel, a capacitor and a power optimizer. In some embodiments, the power optimizer is implemented as a four-switch buck-boost converter. The structure of the power modules has been discussed above with respect to FIGS. 3-4, and hence is not discussed again to avoid repetition.

The solar power system 100 may further comprise a plurality of local controllers and at least a central controller. Each local controller is employed to control the operation of a corresponding power module. The central controller is employed to control the operation of the inverter.

The method 700 starts at step 702 where the local controllers and the central controller of the solar power system reset a plurality of registers. For example, various operation parameters measured previously and saved in the register units of the local controllers and the central controller are reset before the local controllers and the central controller proceed further.

At step 704, the local controllers configure their respective solar panels to operate at their maximum output power Pmax (e.g., P1max, P2max, ..., Pnmax) through a suitable control mechanism such as a trial and error process discussed about with respect to FIG. 6. The local controllers detect or measure the power flows of the power modules. It should be noted the measured power flow is the maximum output power of each power module. Also at step 704, the local controllers detect or measure the maximum power point tracking (MPPT) currents of the solar panels. The MPPT currents of the solar panels are Imp1, Imp2, ..., Impn. The MPPT current (e.g., Imp) of a solar panel has been discussed above with respect to FIG. 6, and hence is not discussed again to avoid repetition.

At step 706, a mode transition range is obtained. In particular, the midpoint Io_typ of the mode transition range is a current flowing through the plurality of power modules. In some embodiments, the current Io_typ is approximately equal to a sum of the maximum power flows (P1max, P2max, ..., Pnmax) of the plurality of power solar panels divided by an input voltage of the inverter. The input voltage of the inverter is regulated by the central controller. In some embodiments, the input voltage of the inverter is proportional to a reference in the central controller. The reference is a predetermined value, which may vary depending on different applications and design needs.

In some embodiments, the lower limit Io_min of the mode transition range is about 95% of the midpoint. The upper limit Io_max of the mode transition range is about 105% of the midpoint. It is appreciated that the values of the upper limit and the lower limit are merely examples, and may be changed to different values depending on different applications and design needs.

At step 708, the local controllers determine whether the MPPT currents of the solar panels fall into the mode transition range. At step 708, if none of the MPPT currents of the solar panels fall into the mode transition range, the method 700 proceeds to step 710 where the respective power optimizers stay at the existing modes (e.g., buck mode or boost mode) to achieve their own maximum available power. Additionally, the central controller regulates the input voltage of the inverter equal to the sum of the maximum power flows (P1max, P2max, . . . , Pnmax) of the plurality of solar panels divided by the current Io_typ.

Also at step 708, if at least one MPPT current falls into the mode transition range, the method 700 proceeds to step 712. At step 712, if only one MPPT current falls into the mode transition range, the method 700 proceeds to step 716. Otherwise, the method 700 proceeds to step 714.

At step 714, for the power modules having their MPPT currents in the mode transition range, the local controllers configure the associated power optimizers to operate in the pass-through mode. Furthermore, at step 714, the central controller regulates the input voltage of the inverter equal to the sum of the maximum power flows (P1max, P2max, . . . , Pnmax) of the plurality of solar panels divided by the current Io_typ.

At step 716, for the power module having the MPPT current in the mode transition range, the corresponding local controller configure the associated power optimizer to operate in the pass-through mode. Furthermore, at step 716, the central controller regulates the input voltage of the inverter equal to the sum of the maximum power flows (P1max, P2max, . . . , Pnmax) of the plurality of solar panels divided by the MPPT current of the power module.

After the method 700 finishes the mode transitions at steps 714 or 716, the method 700 proceeds to step 718 where after a suitable delay, the method 700 return to step 702.

Figure 9:
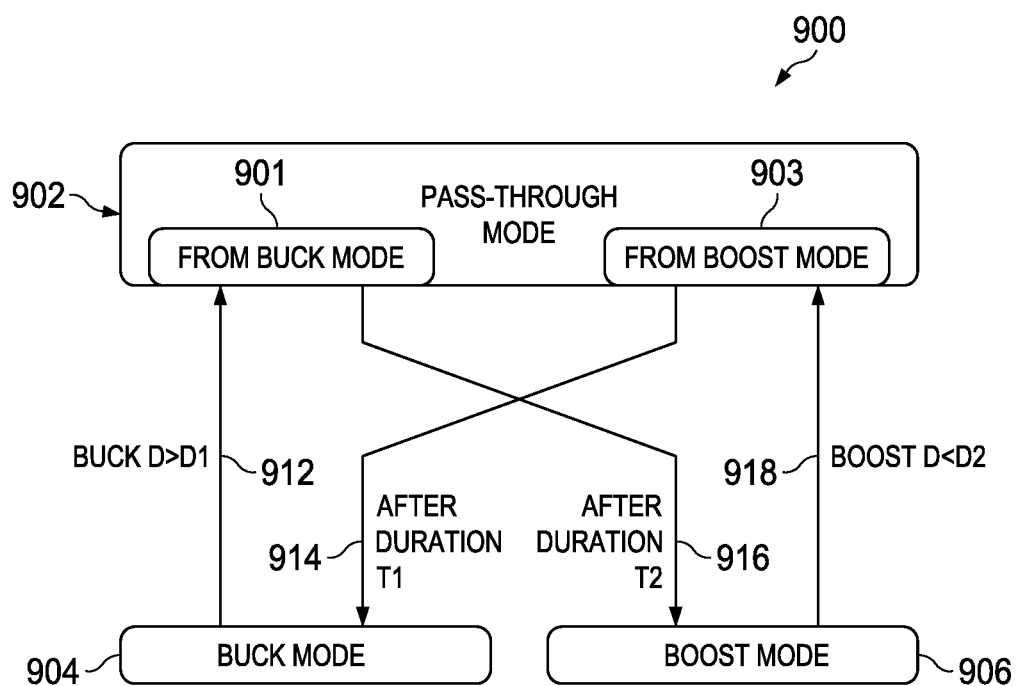
FIG. 9 illustrates a mode transition control scheme in accordance with various embodiments of the present application.

FIG. 9 illustrate a mode transition control scheme in accordance with various embodiments of the present application. This control scheme shown in FIG. 9 is merely an example, which should not unduly limit the scope of the claims. One of ordinary skill in the art would recognize many variations, alternatives, and modifications.

According to the flow chart shown in FIGS. 7-8, the power optimizers may operate in three modes, namely the buck mode, the boost mode and the pass-through mode. Before a mode transition process, a power optimizer operates in a buck mode 904. A local controller associated with the power optimizer may configure the power optimizer to leave the buck mode and enter the pass-through mode as indicated by arrow 912 if a duty cycle of the buck portion of the power optimizer is greater than a predetermined value D1. In some embodiments, the predetermined value D1 is about 98%. In the pass-through mode 902, the power optimizer is labelled as a power optimizer entering the pass-through mode from the buck mode. If this power optimizer leaves the pass-through mode, it has to enter the boost mode 906 as indicated by arrow 916. In addition, the power optimizer cannot enter the boost mode 906 immediately. There is a predetermined delay T2. In some embodiments, the predetermined delay T2 is in a range from about one second to about three seconds.

Similarly, before a mode transition process, a power optimizer may operate in the boost mode 906. The local controller may configure the power optimizer to leave the boost mode 906 and enter the pass-through mode 902 as indicated by arrow 918 if a duty cycle of the boost portion of the power optimizer is less than a predetermined value D2. In some embodiments, the predetermined value D2 is about 2%. In the pass-through mode 902, the power optimizer is labelled as a power optimizer entering the pass-through mode from the boost mode. If this power optimizer leaves the pass-through mode, it has to enter the buck mode 904 as indicated by arrow 914. In addition, the power optimizer cannot enter the buck mode 904 immediately. There is a predetermined delay T1. In some embodiments, the predetermined delay T1 is in a range from about one second to about three seconds.

Figure 10:
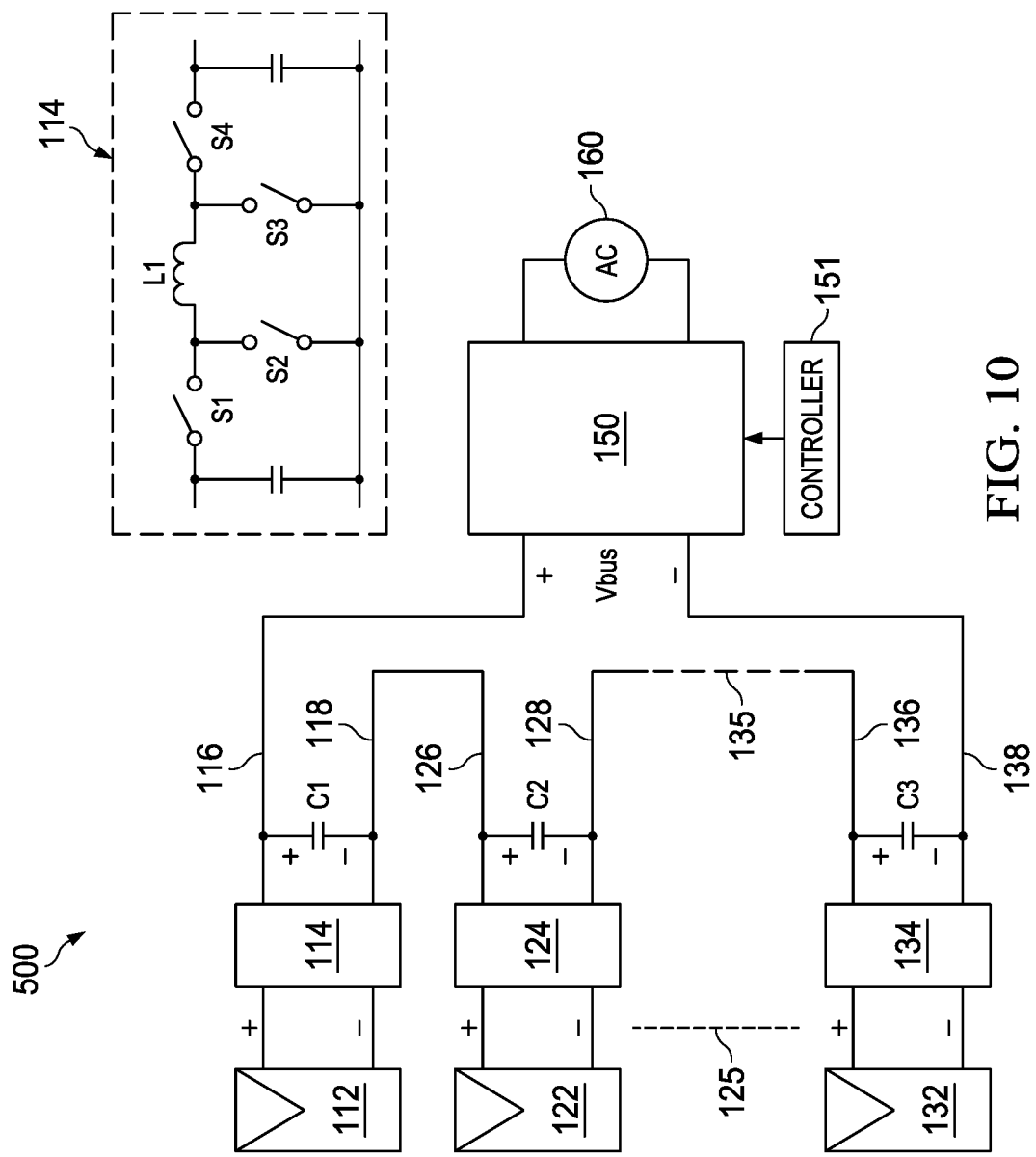
FIG. 10 illustrates a block diagram of another solar power system in accordance with various embodiments of the present disclosure.

FIG. 10 illustrates a block diagram of another solar power system in accordance with various embodiments of the present disclosure. The solar power system 500 is similar to the solar power system 100 shown in FIG. 1 except that each solar panel (e.g., the first solar panel 112) and its corresponding power optimizer (e.g., the first power optimizer 114) are connected in cascade. The output capacitors C1, C2 and C3 are placed at the outputs of their respective power optimizers.

In some embodiments, the power optimizers 114, 124 and 134 are implemented as four-switch buck boost converters. For simplicity, only the schematic diagram of the first power optimizer 114 is illustrated in FIG. 10. The control mechanisms discussed above with respect to FIGS. 7-9 are applicable to the solar power system 500. More particularly, under the control mechanisms described above, the power optimizers 114, 124 and 134 are capable of switching among the buck mode, the boost mode and the pass-through mode, thereby improving the efficiency of the solar power system 500.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. An apparatus comprising:
a four-switch power converter having input terminals coupled to a first terminal and a second terminal of a power source respectively, and output terminals coupled to a first terminal and a second terminal of a capacitor respectively, wherein:
the first terminal of the power source is connected to the second terminal of the capacitor;
a first switch and a second switch of the four-switch power converter are connected in series between the first terminal and the second terminal of the power source; and
a third switch and a fourth switch of the four-switch power converter are connected in series between the first terminal of the capacitor and the second terminal of the power source.

2. The apparatus of claim 1, wherein:
the power source is a solar panel configured to generate a direct current (DC) voltage.

3. The apparatus of claim 2, wherein:
the four-switch power converter, the capacitor and the power source form a power module, and wherein:
the capacitor is connected between a positive terminal of the power source and a first output terminal of the power module; and
a negative terminal of the power source is connected to a second output terminal of the power module.

4. The apparatus of claim 2, wherein:
the four-switch power converter, the capacitor and the power source form a power module, and wherein:
the capacitor is connected between a negative terminal of the power source and a second output terminal of the power module; and
a positive terminal of the power source is connected to a first output terminal of the power module.

5. The apparatus of claim 1, wherein:
the four-switch power converter is a four-switch buck-boost converter.

6. The apparatus of claim 5, wherein the four-switch buck-boost converter comprises:
an inductor connected between a common node of the first switch and the second switch, and a common node of the third switch and the fourth switch.

7. The apparatus of claim 6, wherein:
the third switch and the fourth switch are connected in series between a negative terminal of the power source and the first terminal of the capacitor, and wherein the second terminal of the capacitor is connected to a positive terminal of the power source.

8. The apparatus of claim 6, wherein:
the third switch and the fourth switch are connected in series between a positive terminal of the power source and the first terminal of the capacitor, and wherein the second terminal of the capacitor is connected to a negative terminal of the power source.

9. The apparatus of claim 6, wherein:
the four-switch buck-boost converter is configured to operate in a pass-through mode after a duty cycle of the third switch is less than a first predetermined duty cycle.

10. The apparatus of claim 6, wherein:
the four-switch buck-boost converter is configured to operate in a pass-through mode after a duty cycle of the first switch is greater than a second predetermined duty cycle.

11. The apparatus of claim 10, wherein:
in the pass-through mode, the first switch and the fourth switch are turned on, and the second switch and the third switch are turned off.

12. The apparatus of claim 1, wherein:
the power source is a solar panel, and wherein one terminal of the capacitor is electrically in direct contact with one terminal of the solar panel.

13. An apparatus comprising:
a solar panel and a capacitor connected in series, wherein a first terminal of the solar panel is connected to a second terminal of the capacitor; and
a buck-boost converter comprising a first switch and a second switch connected in series between the first terminal and a second terminal of the solar panel, and a third switch and a fourth switch connected in series between a first terminal of the capacitor and the second terminal of the solar panel.

14. The apparatus of claim 13, wherein:
the buck-boost converter is a four-switch buck-boost converter.

15. The apparatus of claim 13, wherein:
the capacitor is electrically in direct contact with the first terminal of the solar panel.

16. The apparatus of claim 15, wherein:
a voltage potential at the first terminal of the solar panel is higher than a voltage potential at the second terminal of the solar panel.

17. An apparatus comprising:
a power source;
a capacitor connected in series with the power source; and
a buck-boost converter having a first switch and a second switch connected in series between a first terminal and a second terminal of the power source, and a third switch and a fourth switch connected in series between a first terminal of the capacitor and the second terminal of the power source.

18. The apparatus of claim 17, wherein the buck-boost converter comprises:
an inductor connected between a common node of the first switch and the second switch, and a common node of the third switch and the fourth switch.

19. The apparatus of claim 18, wherein:
the capacitor and the power source are connected between the first terminal of the capacitor and the second terminal of the power source, and wherein a positive terminal of the power source is connected to the capacitor.

20. The apparatus of claim 18, wherein:
the power source and the capacitor are connected between the second terminal of the power source and the first terminal of the capacitor, and wherein a negative terminal of the power source is connected to the capacitor.

* * * * *